US008661791B2

(12) United States Patent
Furness (10) Patent No.: US 8,661,791 B2
(45) Date of Patent: Mar. 4, 2014

(54) SYSTEMS AND METHODS FOR CONTROLLING REGENERATION OF NITROGEN OXIDE ADSORBERS (75) Inventor: Mary Beth Furness, Ann Arbor, MI (US)

(73) Assignee: GM Global Technology Operations LLC

( * ) Notice: Subject to any disclaimer, the term of this patent is extended or adjusted under 35 U.S.C. 154(b) by 1176 days.

(21) Appl. No.: 12/577,383

(22) Filed: Oct. 12, 2009

(65) Prior Publication Data

US 2011/0083422 A1    Apr. 14, 2011

(51) Int. Cl.
*F01N 3/00* (2006.01)
*F01N 3/10* (2006.01)

(52) U.S. Cl.
USPC ............... 60/295; 60/274; 60/276; 60/277; 60/285; 60/286; 60/297; 60/303

(58) Field of Classification Search
USPC ........... 60/274, 276, 277, 285, 286, 295, 301, 60/303
See application file for complete search history.

(56) References Cited

U.S. PATENT DOCUMENTS 6,761,025 B1 *  7/2004  Gladden ..................... 60/286
6,996,975 B2   2/2006  Radhamohan et al.
7,377,101 B2   5/2008  Mital et al.

* cited by examiner

*Primary Examiner* — Thomas Denion
*Assistant Examiner* — Diem Tran (57) ABSTRACT An exhaust treatment system includes a nitrogen oxide (NOx) monitoring module and a regeneration control module. The NOx monitoring module monitors first and second NOx levels in an exhaust stream produced by an engine, wherein the first NOx level is measured between first and second portions of a substrate of a NOx adsorber, wherein the second NOx level is measured upstream from the first portion of the substrate, and wherein the first portion of the substrate is upstream from the second portion of the substrate. The regeneration control module initiates a regeneration cycle of the NOx adsorber when the first NOx level is greater than a predetermined percentage of the second NOx level, wherein the regeneration cycle includes injecting hydrocarbons (HC) into the exhaust stream at a location upstream from the NOx adsorber.

20 Claims, 5 Drawing Sheets

SYSTEMS AND METHODS FOR CONTROLLING REGENERATION OF NITROGEN OXIDE ADSORBERS

FIELD

The present disclosure relates to internal combustion engines, and more particularly to systems and methods for controlling regeneration of nitrogen oxide (NOx) adsorbers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to produce drive torque. Engines that operate with leaner than stoichiometric A/F mixtures (higher A/F ratios) may be referred to as "lean burn engines." For example, lean burn engines may include diesel engines, homogenous charge compression ignition (HCCI) engines, and/or engines that include lean-idle operation and/or stratified fuel charge operation (i.e. ultra lean burn).

Combustion of lean A/F mixtures may produce exhaust gas with increased amounts of carbon monoxide (CO), hydrocarbons (HC), and/or nitrogen oxides (NOx). Typical exhaust systems include catalytic converters (e.g. three-way catalytic converters) that chemically convert exhaust gas into carbon dioxide ($CO_2$), nitrogen (N), and water ($H_2O$). However, typical catalytic converters may not efficiently treat exhaust that includes oxygen levels above a particular threshold (e.g. 0.5-1.0%).

Therefore, more complex exhaust treatment systems may be required to maintain NOx levels below a predetermined level. For example, an exhaust treatment system may include an oxidation catalyst (OC), a selective catalytic reduction (SCR) system, and a particulate matter filter (PMF). The OC oxidizes the CO and the HC to form carbon dioxide and water. The SCR system reduces NOx in the exhaust gas. The PMF removes particulate matter from the exhaust gas.

However, SCR systems may be limited due to the required storing and injecting of a dosing agent. In other words, the dosing agent may be depleted during engine operation, thus disabling the SCR system. Furthermore, the dosing agent may be stored in a storage tank that requires a large amount of space. NOx adsorbers, however, do not require an additional dosing agent and similarly require less space than typical SCR systems. Therefore, NOx adsorbers may be implemented in exhaust treatment systems to reduce and/or remove NOx from exhaust gas.

SUMMARY

An exhaust treatment system includes a nitrogen oxide (NOx) monitoring module and a regeneration control module. The NOx monitoring module monitors first and second NOx levels in an exhaust stream produced by an engine, wherein the first NOx level is measured between first and second portions of a substrate of a NOx adsorber, wherein the second NOx level is measured upstream from the first portion of the substrate, and wherein the first portion of the substrate is upstream from the second portion of the substrate. The regeneration control module initiates a regeneration cycle of the NOx adsorber when the first NOx level is greater than a predetermined percentage of the second NOx level, wherein the regeneration cycle includes injecting hydrocarbons (HC) into the exhaust stream at a location upstream from the NOx adsorber.

A method includes monitoring first and second NOx levels in an exhaust stream produced by an engine, wherein the first NOx level is measured between first and second portions of a substrate of a NOx adsorber, wherein the second NOx level is measured upstream from the first portion of the substrate, and wherein the first portion of the substrate is upstream from the second portion of the substrate, and initiating a regeneration cycle of the NOx adsorber when the first NOx level is greater than a predetermined percentage of the second NOx level, wherein the regeneration cycle includes injecting hydrocarbons (HC) into the exhaust stream at a location upstream from the NOx adsorber.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

Typical nitrogen oxide (NOx) adsorbers adsorb NOx from exhaust gas during lean operation and store the NOx in a NOx adsorber catalyst until a saturation condition is present. The saturation condition may correspond to when the NOx adsorber may no longer adsorb NOx, after which a regeneration cycle may begin. The regeneration cycle may include introducing a reductant into the exhaust stream to initiate catalyzation of the stored NOx in the NOx adsorber. For example only, the reductant may be hydrocarbons (HC). In other words, the NOx may be released from the NOx adsorber catalyst and may be catalytically converted to nitrogen (N), carbon (C), and water ($H_2O$).

Regeneration of typical NOx adsorbers may be controlled based on NOx amounts before and after the NOx adsorber. More specifically, the NOx amount after the NOx adsorber (downstream) may be approximately zero until the NOx adsorber catalyst becomes saturated. After the NOx adsorber catalyst becomes saturated, the NOx amount downstream from the NOx adsorber may increase. Therefore, a regeneration cycle may be initiated when the NOx amount downstream from the NOx adsorber is greater than a predetermined threshold.

However, initiating regeneration based on the NOx amount downstream from the NOx adsorber may result in deterioration of a front (upstream) portion of the NOx adsorber catalyst. More specifically, the saturation condition may detected after thermal deterioration, sulfur poisoning, and/or sulfur contamination occur at the upstream portion of the NOx adsorber catalyst.

Therefore, systems and methods are presented that measure amounts of NOx before (upstream from) a NOx adsorber catalyst, and at one point mid-substrate of the NOx adsorber catalyst. The systems and methods presented initiate a regeneration cycle of the NOx adsorber when the middle NOx measurement is greater than a predetermined percentage of the upstream NOx measurement. Thus, the systems and methods presented may achieve a quicker response time in determining when a saturation condition occurs and. The quicker response time may reduce or prevent the effects of thermal deterioration, sulfur poisoning, and/or sulfur contamination at an upstream portion of the NOx adsorber catalyst.

Furthermore, the systems and methods presented may determine when the NOx adsorber is in a failure state. More specifically, the systems and methods presented may determine when the NOx adsorber is damaged and thus is no longer achieving emissions requirements. More specifically, the systems and methods presented may compare NOx measurements from the NOx adsorber both after a regeneration cycle and after a desulfation cycle to predetermined thresholds to determine whether the NOx adsorber is functioning properly (i.e. not in the failure state).

Figure 1:
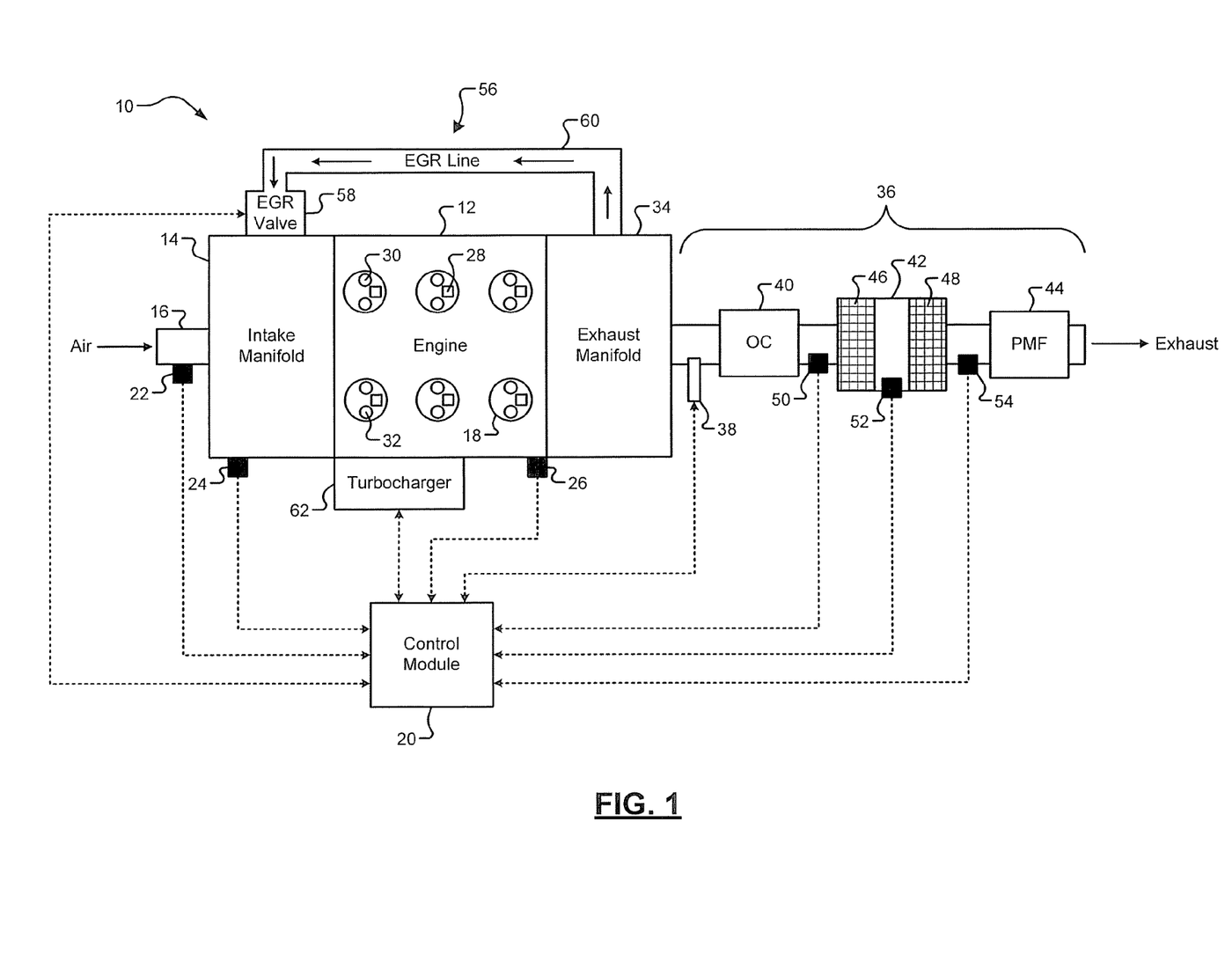
FIG. 1 is a functional block diagram of an exemplary engine system according to the present disclosure.

Referring now to FIG. 1, an engine system 10 includes a lean burn, direct-injection (DI) engine 12. For example, the engine 12 may be a diesel engine, a homogenous charge compression ignition (HCCI) engine, or an engine that includes lean-idle operation or stratified fuel charge operation (i.e. ultra lean burn).

The engine 12 combusts an air/fuel (A/F) mixture to produce drive torque. Air is drawn into an intake manifold 14 through an inlet 16. A throttle (not shown) may be included to regulate air flow into the intake manifold 14. Air within the intake manifold 14 is distributed into a plurality of cylinders 18. While six cylinders 18 are shown, it can be appreciated that the engine 12 may include other numbers of cylinders.

The engine system 10 includes a control module 20 that communicates with components of the engine system 10. For example, the components may include the engine 12, sensors, and/or actuators as discussed herein. The control module 20 may implement the NOx adsorber regeneration and diagnostic systems and methods of the present disclosure.

Air is passed from the inlet 16 through a mass airflow (MAF) sensor 22. The MAF sensor 22 generates a MAF signal that indicates a rate of air flowing through the MAF sensor 22. A manifold pressure (MAP) sensor 24 is positioned in the intake manifold 14 between the inlet 16 and the engine 12. The MAP sensor 24 generates a MAP signal that indicates air pressure in the intake manifold 14.

An engine crankshaft (not shown) rotates at engine speed or a rate that is proportional to engine speed. A crankshaft sensor 26 senses a position of the crankshaft and generates a crankshaft position (CP) signal. The CP signal may be related to the rotational speed of the crankshaft and cylinder events. For example only, the crankshaft sensor 26 may be a variable reluctance sensor. Alternatively, the engine speed and cylinder events may be sensed using other suitable methods.

An intake valve 30 selectively opens and closes to enable air to enter the cylinder 18. An intake camshaft (not shown) regulates intake valve position. The control module 20 actuates fuel injectors 28 to inject fuel into the cylinders 18 (i.e. direct injection, or DI). A piston (not shown) compresses and combusts the A/F mixture within the cylinder 18. The piston drives the crankshaft during a power stroke to produce drive torque.

Exhaust gas resulting from the combustion within the cylinder 18 is forced out through an exhaust manifold 34 when an exhaust valve 32 is in an open position. An exhaust camshaft (not shown) regulates exhaust valve position. While separate intake and exhaust camshafts are discussed, it can be appreciated that a single camshaft may control both the intake valves 30 and the exhaust valves 32 (e.g. single overhead camshaft, or SOHC).

An exhaust treatment system 36 may treat the exhaust gas. The exhaust treatment system 36 may include a hydrocarbon (HC) injector 38, an oxidation catalyst (OC) 40, a NOx adsorber 42, and a particulate matter filter (PMF) 44. The HC injector 38 selectively injects hydrocarbons into an exhaust stream. The OC 40 oxidizes carbon monoxide (CO) and hydrocarbons (HC) in the exhaust gas. The NOx adsorber 42 adsorbs NOx in the exhaust gas. The PMF 44 removes particulate matter from the exhaust gas.

The NOx adsorber 42 may further include a first substrate 46 and a second substrate 48. For example, the first and second substrates 46, 48 may be zeolites. While two substrates 46, 48 are shown, it can be appreciated that other numbers of substrates may be implemented.

The exhaust treatment system 36 may further include NOx sensors 50, 52, 54. Each NOx sensor 50, 52, 54 may generate a signal that indicates an amount of NOx in the exhaust gas. NOx sensor 50 indicates a first NOx level ($NOx_1$) of he exhaust gas before (upstream of) the first substrate 46 of the NOx adsorber 42. NOx sensor 52 indicates a second NOx level ($NOx_2$) of the exhaust gas after (downstream of) the first substrate 46 of the NOx adsorber 42 and before (upstream of) the second substrate 48 of the NOx adsorber 42. In other words, NOx sensor 52 indicates an amount of NOx between the first substrate 46 and the second substrate 48 of the NOx adsorber 42. NOx sensor 54 indicates a third NOx level ($NOx_3$) of the exhaust gas after (downstream of) the second substrate 48 of the NOx adsorber 42.

While three NOx sensors 50, 52, 54 are shown, it can be appreciated that the exhaust treatment system 36 may include other numbers of NOx sensors or software models could be used in place of NOx sensors to determine NOx levels. For example, two NOx sensors may be implemented. More specifically, one of the two NOx sensors may measure a NOx level upstream from the first substrate 46 while the other of the two NOx sensors may measure a NOx level either between the first and second substrates 46, 48 or downstream from the second substrate 48.

The control module 20 may determine when to start a regeneration cycle of the NOx adsorber 42 based on the signals from the NOx sensors 50, 52, 54. Similarly, the control module 20 may determine when to start a desulfation cycle based on the signals from the NOx sensors 50, 52, 54.

The engine system 10 may further include an exhaust gas recirculation (EGR) system 56. The EGR system 56 includes an EGR valve 58 and an EGR line 60. The EGR system 56 may introduce a portion of exhaust gas from the exhaust manifold 34 into the intake manifold 24. The EGR valve 58 may be mounted on the intake manifold 14. The EGR line 60 may extend from the exhaust manifold 34 to the EGR valve 58, providing communication between the exhaust manifold 34 and the EGR valve 58. The control module 20 may actuate the EGR valve 58 to increase or decrease an amount of exhaust gas introduced into the intake manifold 14.

The engine 12 may also include a turbocharger 62. The turbocharger 62 may be driven by the exhaust gas received through a turbine inlet. For example only, the turbocharger 62 may include a variable nozzle turbine. The turbocharger 62 increases airflow into the intake manifold to cause an increase in intake manifold pressure (i.e., boost pressure). The control module 20 actuates the turbocharger 62 to selectively restrict the flow of the exhaust gas, thereby controlling the boost pressure.

Figure 2:
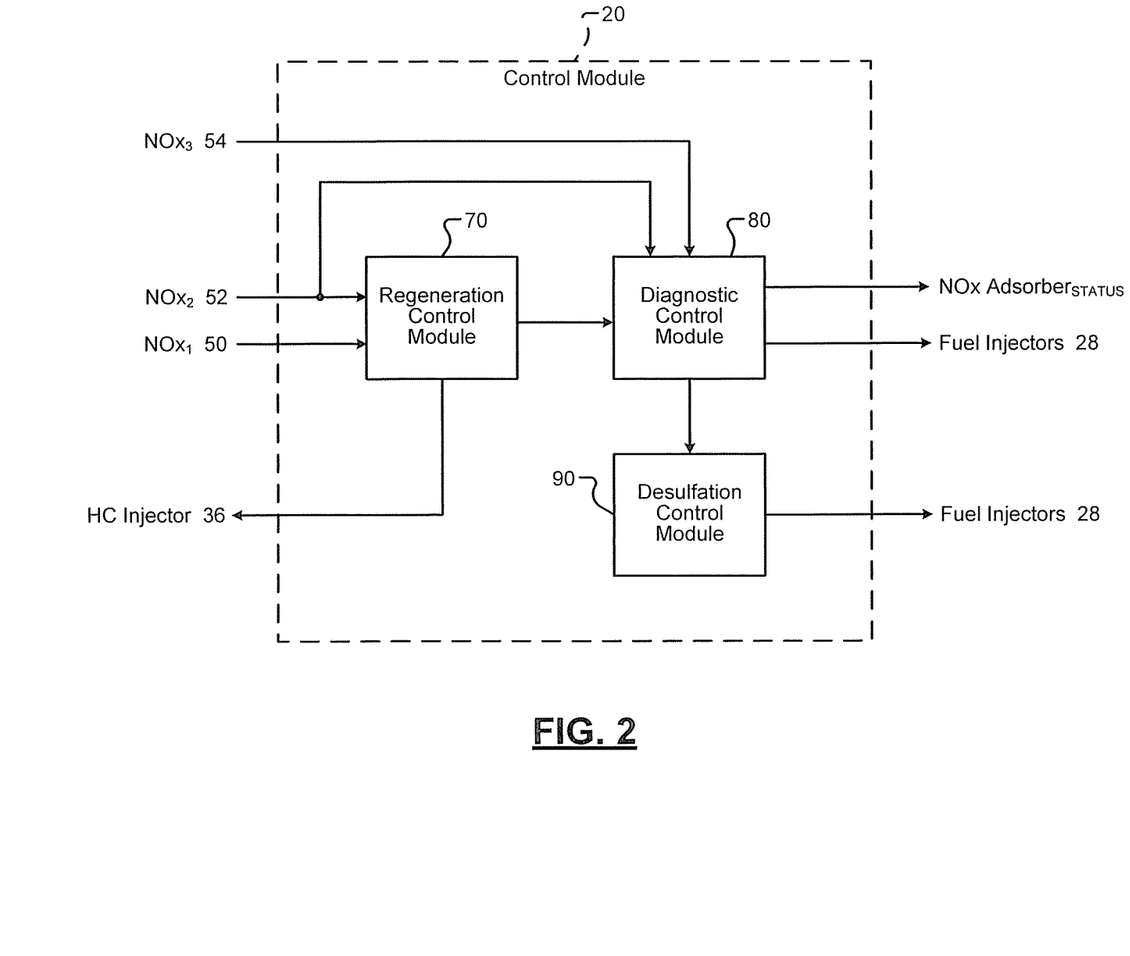
FIG. 2 is a functional block diagram of an exemplary control module according to the present disclosure.

Referring now to FIG. 2, the control module 20 is shown in more detail. The control module 20 may include a regeneration control module 70, a diagnostic control module 80, and a desulfation control module 90.

Figure 3:
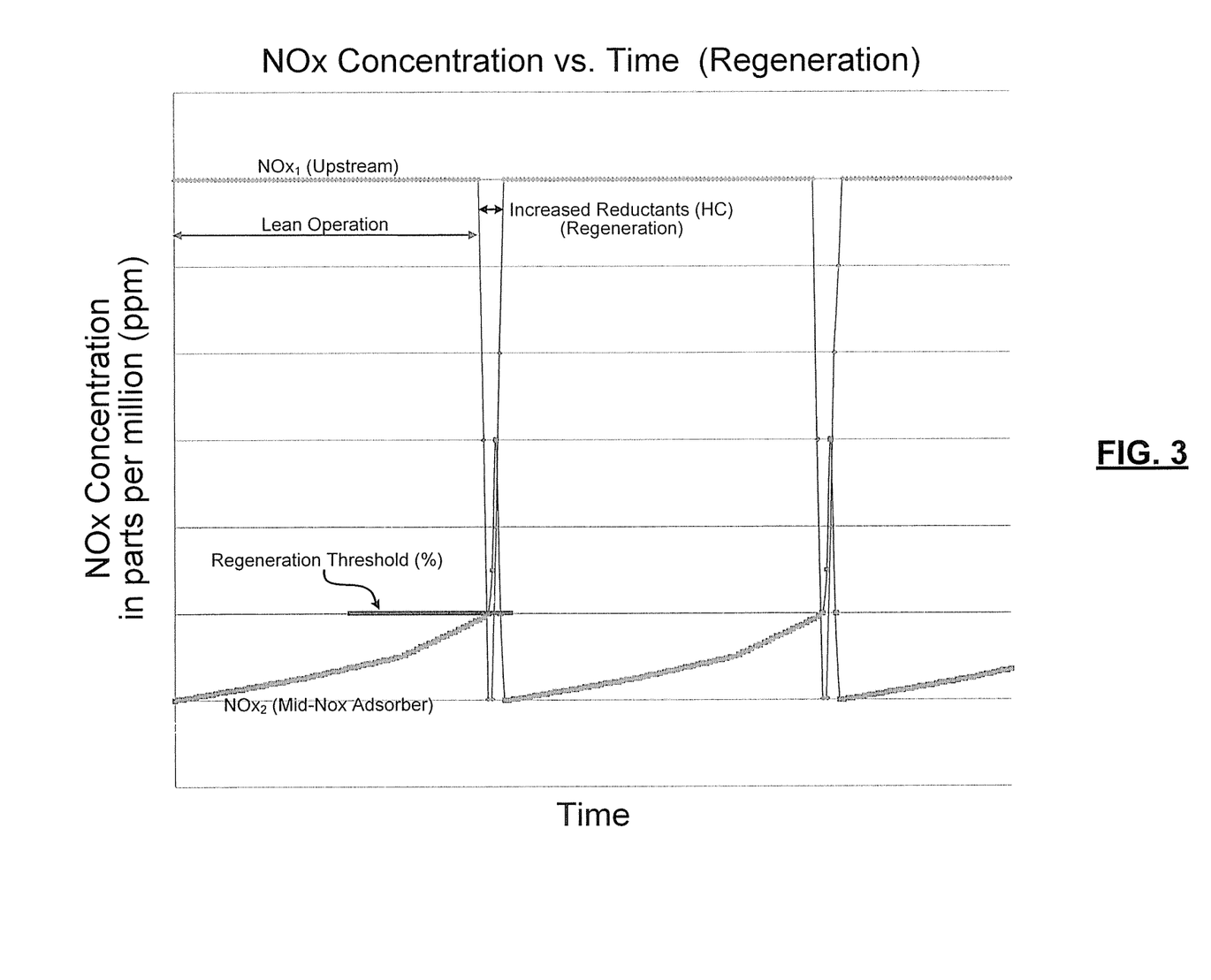
FIG. 3 is a graph illustrating varying nitrogen oxide (NOx) concentration between substrates of a NOx adsorber over time for determining when to start a regeneration cycle.

Referring now to FIGS. 2 and 3, the regeneration control module 70 receives signals from NOx sensors 50, 52. The regeneration control module 70 determines when a saturation condition of the NOx adsorber 42 is present, and then initiates a regeneration cycle. More specifically, the regeneration control module 70 may determine when a NOx level corresponding to NOx sensor 52 is greater than a predetermined percentage of a NOx level corresponding to NOx sensor 50. In other words, the regeneration control module 70 may determine when a NOx level between the substrates of the NOx adsorber 42 is greater than the predetermined percentage of a NOx level upstream from the first substrate 46 of the NOx adsorber 42.

The predetermined percentage corresponds to the saturation condition of the NOx adsorber 42. However, the saturation condition may not be complete saturation of the NOx adsorber 42. In other words, the saturation condition may be less than complete saturation to prevent damage to the NOx adsorber 42. When the saturation condition is present, the regeneration control module 70 may initiate a regeneration cycle of the NOx adsorber 42. The regeneration cycle may include injecting HC into the exhaust stream using the HC injector 38 or by generating a rich A/F ratio using the fuel injectors 28. For example only, the HC injector 38 may inject fuel into the exhaust stream. The introduction of HC in the exhaust stream may increase the temperature of the exhaust gas, which may begin a catalytic reaction that converts the stored NOx in the NOx adsorber into hydrogen (H), carbon (C), and water ($H_2O$).

The diagnostic control module 80 may monitor operation of the NOx adsorber 42 to determine when the NOx adsorber is in a failure state. More specifically, the diagnostic control module 80 may determine when the NOx adsorber 42 is malfunctioning.

First, the diagnostic control module 80 may monitor a NOx level after (downstream from) the first substrate 46 or the second substrate 48 of the NOx adsorber 42 after a regeneration cycle is complete. The diagnostic control module 80 may compare the monitored NOx level to a predetermined threshold ($NOx_{THR1}$). In other words, the diagnostic control module 80 may determine whether the NOx adsorber 42 is functioning properly (i.e. efficiently) after a regeneration cycle.

Second, the diagnostic control module 80 may initiate a desulfation cycle when the monitored NOx level is greater than the predetermined threshold ($NOx_{THR1}$). In other words, the NOx adsorber 42 may be malfunctioning due to excessive sulfur levels in the NOx adsorber 42.

Figure 4:
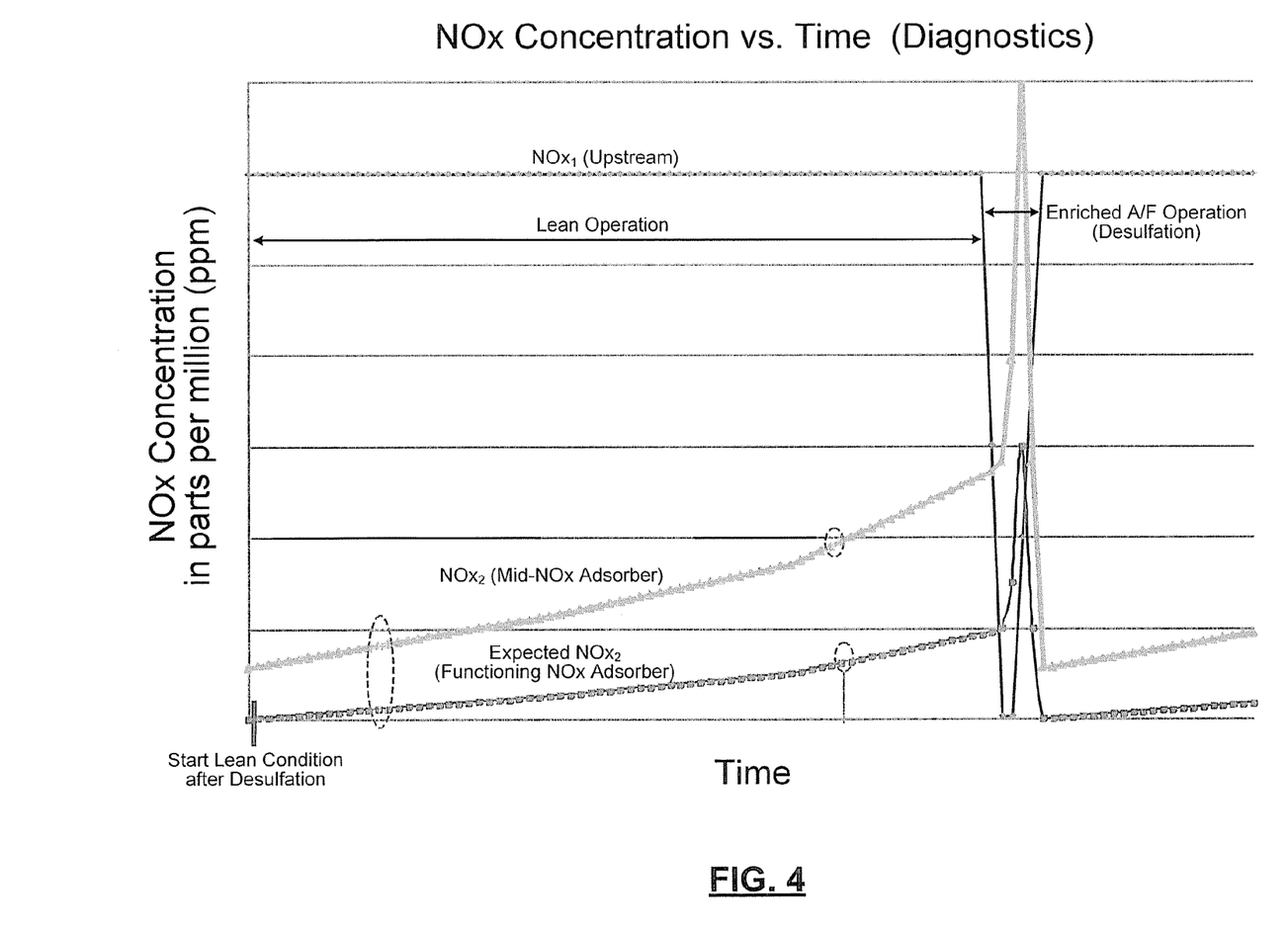
FIG. 4 is a graph illustrating varying NOx concentration downstream of the NOx adsorber over time for determining when the NOx adsorber is in a failure state.

Referring now to FIGS. 2 and 4, a desulfation control module 90 may enrich the A/F ratio of the engine 12. For example, the desulfation control module 90 may increase an amount of fuel injected into the cylinders 18 by the fuel injectors 28. The rich A/F ratio may increase the temperature of the exhaust gas. The higher temperature exhaust gas may breakdown excessive sulfur in the NOx adsorber 42 (i.e. sulfur accumulated upstream of the first substrate 46 of the NOx adsorber 42).

Lastly, the diagnostic control module 80 may monitor the NOx level downstream of the first substrate 46 of the NOx adsorber 42 after a desulfation cycle is complete. The NOx adsorber 42 may include maximum adsorbing capacity after both a regeneration cycle and a desulfation cycle, unless the NOx adsorber 42 is damaged (i.e. in the failure state).

Thus, the diagnostic control module 80 may command lean operation of the engine 12. For example, the diagnostic control module 80 may lean the A/F ratio of the engine 12 by decreasing an amount of fuel injected into the cylinders 18 by the fuel injectors 28. The diagnostic control module 80 may monitor the NOx level between the substrates 46, 48 of the NOx adsorber 42 using NOx sensor 52. The diagnostic control module 80 may determine a period for the NOx level between the substrates 46, 48 of the NOx adsorber to reach a predetermined threshold ($Time_{THR1}$). The diagnostic control module 80 may then compare the determined period to a predetermined diagnostic period. In other words, if the determined period is less than the predetermined diagnostic period, the NOx adsorber 42 is malfunctioning (i.e. in the failure state). Thus, the diagnostic control module 80 may generate a NOx adsorber failure signal (i.e. a warning signal or a status flag).

Figure 5:
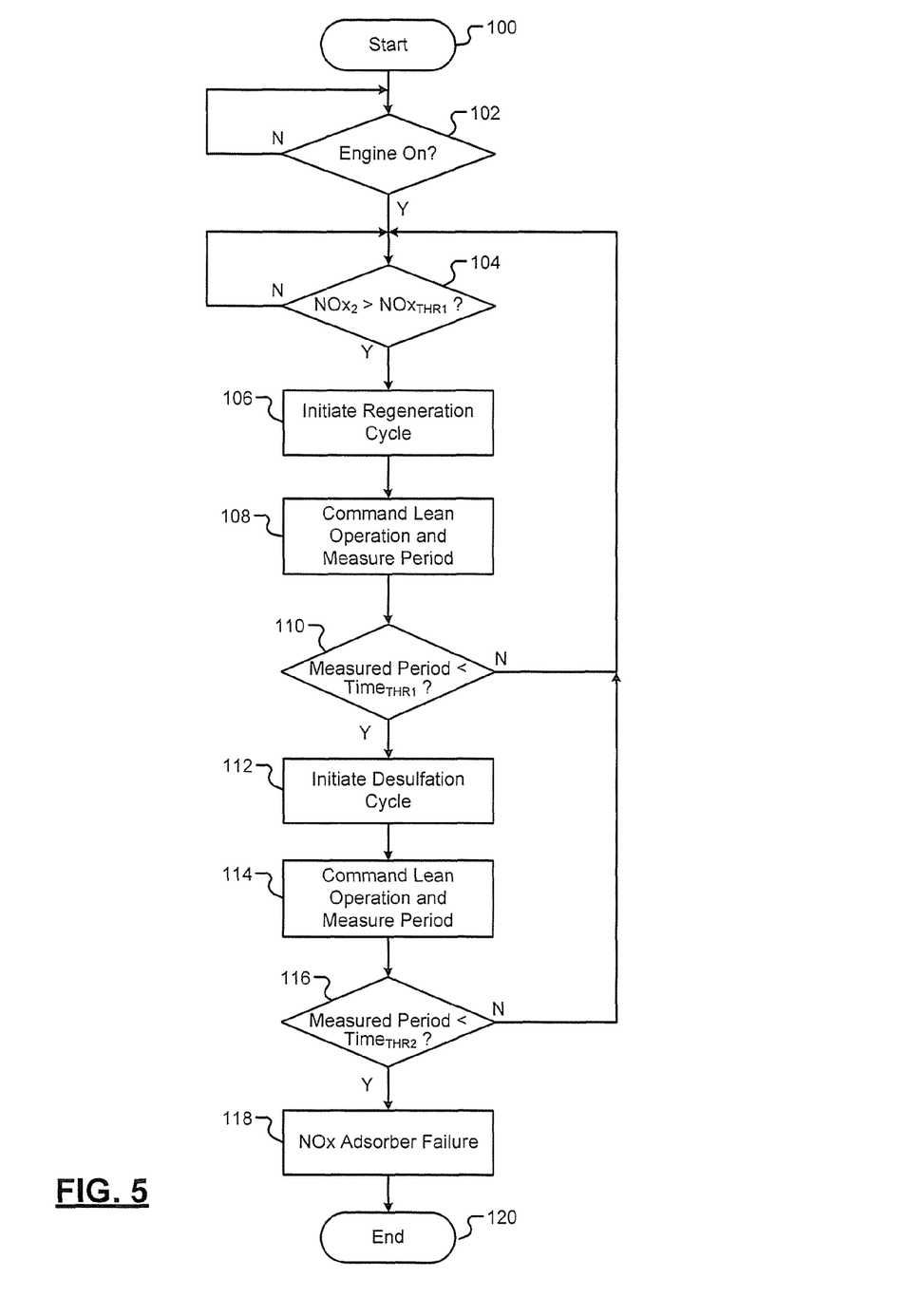
FIG. 5 is a flow diagram of a method for NOx adsorber regeneration and diagnostics according to the present disclosure.

Referring now to FIG. 5, a method for regenerating and diagnosing a state of the NOx adsorber begins in step 100. In step 102, the control module 20 determines whether the engine 12 is running. If true, control may proceed to step 104. If false, control may return to step 102.

In step 104, the control module 20 determines whether the second NOx level ($NOx_2$) is greater than a first NOx level threshold ($NOx_{THR1}$). For example, the second NOx level ($NOx_2$) may be measured either between the first and second substrates 46, 48 of the NOx adsorber 42 or downstream from the second substrate 48 of the NOx adsorber 42. Additionally, for example, the first NOx level threshold ($NOx_{THR1}$) may correspond to a predetermined percentage of the first NOx level (i.e. upstream from the first substrate 46 of the NOx adsorber 42). If true, control may proceed to step 106. If false, control may return to step 104.

In step 106, the control module 20 may initiate a regeneration cycle of the NOx adsorber 42. More specifically, the control module 20 may control injection of reductants (i.e. HC) into the exhaust stream to convert the stored NOx in the NOx adsorber 42 to hydrogen (H), carbon (C), and water ($H_2O$). In step 108, the control module 20 may command lean operation of the engine 12 and measures a period for the second NOx level ($NOx_2$) to reach a predetermined NOx level.

In step 110, the control module 20 may determine whether the measured period is less than a first diagnostic period ($Time_{THR1}$). In other words, the control module 20 may determine whether the NOx adsorber 42 is functioning properly after the regeneration cycle. If false, control may return to step 104. If true, control may proceed to step 112.

In step 112, the control module 20 may initiate a desulfation cycle of the NOx adsorber 42. More specifically, the control module 20 may control air and/or fuel to decrease the A/F ratio of the engine 12 (i.e. enrich the A/F mixture). In step 114, the control module 20 may command a lean operation condition after the desulfation cycle and then measure a period for the second NOx level ($NOx_2$) to reach a predetermined NOx level.

In step 116, the control module 20 may determine whether the measured period is less than a second diagnostic period ($Time_{THR2}$). For example, in one embodiment the two diagnostic periods $Time_{THR1}$, $Time_{THR2}$ are the same. If false, control may return to step 104. If true, control may proceed to step 118.

In step 118, the control module 20 may determine that the NOx adsorber 42 is malfunctioning (i.e. in a failure state). The control module 20 may generate a failure signal or set a failure flag, and control may end in step 120.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust treatment system, comprising:
a nitrogen oxide (NOx) monitoring module that monitors first and second NOx levels in an exhaust stream produced by an engine, wherein the first NOx level is measured between first and second portions of a substrate of a NOx adsorber, wherein the second NOx level is measured upstream from the first portion of the substrate, and wherein the first portion of the substrate is upstream from the second portion of the substrate; and
a regeneration control module that initiates a regeneration cycle of the NOx adsorber when the first NOx level is greater than a predetermined percentage of the second NOx level, wherein the regeneration cycle includes injecting hydrocarbons (HC) into the exhaust stream at a location upstream from the NOx adsorber.

2. The exhaust treatment system of claim 1, wherein the substrate of the NOx adsorber includes a zeolite.

3. The exhaust treatment system of claim 1, wherein the NOx adsorber includes first and second substrates, wherein the first NOx level is measured one of between the first and second substrates and downstream from the second substrate, and wherein the second substrate is downstream from the first substrate.

4. The exhaust treatment system of claim 1, further comprising a diagnostic control module that determines a status of the NOx adsorber based on the first NOx level within a predetermined period after at least one of the regeneration cycle and a desulfation cycle, wherein the desulfation cycle includes decreasing an A/F ratio of the engine.

5. The exhaust treatment system of claim 4, wherein the diagnostic control module initiates the desulfation cycle within a predetermined period after the regeneration cycle and when the first NOx level is greater than a first NOx threshold.

6. The exhaust treatment system of claim 5, wherein the diagnostic control module increases the A/F ratio of the engine within a predetermined period after the desulfation cycle to command a lean operating condition.

7. The exhaust treatment system of claim 6, wherein the diagnostic control module measures a period for the first NOx level to reach a predetermined NOx level after the desulfation cycle and after commanding the lean operating condition.

8. The exhaust treatment system of claim 7, wherein the diagnostic control module determines a state of the NOx adsorber based on the measured period and a predetermined diagnostic period.

9. The exhaust treatment system of claim 8, wherein the diagnostic control module determines that the NOx adsorber is in a failure state when the measured period is less than the predetermined diagnostic period.

10. The exhaust treatment system of claim 4, further comprising:
a first NOx sensor that generates a signal corresponding to the first NOx level; and
a second NOX sensor that generates a signal corresponding to the second NOx level.

11. A method, comprising:
monitoring first and second NOx levels in an exhaust stream produced by an engine, wherein the first NOx level is measured between first and second portions of a substrate of a NOx adsorber, wherein the second NOx level is measured upstream from the first portion of the substrate, and wherein the first portion of the substrate is upstream from the second portion of the substrate; and
initiating a regeneration cycle of the NOx adsorber when the first NOx level is greater than a predetermined percentage of the second NOx level, wherein the regeneration cycle includes injecting hydrocarbons (HC) into the exhaust stream at a location upstream from the NOx adsorber.

12. The method of claim 11, wherein the substrate of the NOx adsorber includes a zeolite.

13. The method of claim 11, wherein the NOx adsorber includes first and second substrates, wherein the first NOx level is measured one of between the first and second substrates and downstream from the second substrate, and wherein the second substrate is downstream from the first substrate.

14. A method comprising:
monitoring first and second NOx levels in an exhaust stream produced by an engine, wherein the first NOx level is measured between first and second portions of a substrate of a NOx adsorber, wherein the second NOx level is measured upstream from the first portion of the substrate, and wherein the first portion of the substrate is upstream from the second portion of the substrate;
initiating a regeneration cycle of the NOx adsorber when the first NOx level is greater than a predetermined percentage of the second NOx level, wherein the regeneration cycle includes injecting hydrocarbons (HC) into the exhaust stream at a location upstream from the NOx adsorber; and
determining a status of the NOx adsorber based on the first NOx level within a predetermined period after at least one of the regeneration cycle and a desulfation cycle, wherein the desulfation cycle includes decreasing an A/F ratio of the engine.

15. The method of claim 14, further comprising:
generating a signal corresponding to the first NOx level using a first NOx sensor; and
generating a signal corresponding to the second NOx level using a second NOx sensor.

16. The method of claim 14, further comprising:
initiating the desulfation cycle within a predetermined period after the regeneration cycle and when the first NOx level is greater than a first NOx threshold.

17. The method of claim 16, further comprising:
increasing the A/F ratio of the engine within a predetermined period after the desulfation cycle to command a lean operating condition.

18. The method of claim 17, further comprising:
measuring a period for the first NOx level to reach a predetermined NOx level after the desulfation cycle and after commanding the lean operating condition.

19. The method of claim 18, further comprising:
determining a state of the NOx adsorber based on the measured period and a predetermined diagnostic period.

20. The method of claim 19, further comprising:
determining that the NOx adsorber is in a failure state when the measured period is less than the predetermined diagnostic period.

* * * * *